May 18, 1965 J. T. FRANKS, JR 3,184,722

MAGNETIC SHIFT REGISTER

Filed Dec. 14, 1961 2 Sheets-Sheet 1

*INVENTOR.*
JOHN T. FRANKS JR.

*BY*

ATTORNEY

MAGNETIC SHIFT REGISTER

Filed Dec. 14, 1961 2 Sheets-Sheet 2

INVENTOR.
JOHN T. FRANKS JR.
BY
ATTORNEY

United States Patent Office 3,184,722
Patented May 18, 1965

3,184,722

MAGNETIC SHIFT REGISTER

John T. Franks, Jr., Akron, Ohio, assignor to Goodyear Aerospace Corporation, a corporation of Delaware Filed Dec. 14, 1961, Ser. No. 159,343
9 Claims. (Cl. 340—174)

This invention relates to a magnetic shift register element and more particularly to multipath magnetic cores coupled together to shift and store bits of information for use in digital computer logic.

Heretofore it has been known to employ multiflux path magnetic elements in magnetic shift registers. These registers require unilateral impedance devices, such as diodes in their transfer loops to maintain the forward flow of the information without any backward flow thereof. The diode is the most expensive and the least reliable element in these type of shift registers. These circuits have the disadvantages of being bulky, of consuming large amounts of power and of having slow speeds.

It is the general object of the invention to avoid and overcome the foregoing and other difficulties of the prior art practice by the provision of a simple, and a compact magnetic core logic circuit that can shift and store bits of information.

Another object of the invention is to provide a magnetic shift register which does not have diodes or other semiconductor elements.

Another object of the invention is to provide a magnetic core circuit which will permit information to enter the core in the form of flux and simultaneously allow other information to leave the core.

Another object of the present invention is to provide an improved magnetic shift register wherein substantially no noise signals are produced.

Another object of the present invention is to provide a magnetic shift register circuit that shifts bits of information from one magnetic element to another magnetic element in a four-phase cycle.

Another object of the present invention is to provide a shift register circuit that shifts information from one memory storing device to another, at a high repetition rate, without affecting the operating of any other connecting input or output circuit.

According to the invention, a magnetic shift register circuit includes two identical multi-aperture ferrite elements which have the property of retaining information which has been set in previously. Each element has a geometric shape which defines a plurality of separate legs. The two elements are connected together by means of a coupling loop of wire. The direction of the flux pattern in respective legs is controlled by currents in drive windings and bias windings magnetically coupled to the legs. An input winding is connected to one of the legs in the first element. An output winding is connected to one of the legs in the second element. An M.M.F. resulting from a current in the input winding will switch the flux pattern in the leg of the first element. This flux pattern represents a bit of information. The information is transferred through the element by the separate phase drives. A change in the flux pattern of the portion of the second element adjacent the output windings will induce an output signal therein.

The exact nature of this invention as well as other objects and advantages thereof will be readily apparent from consideration of the following specification relating to the annexed drawing in which.

Figure 1:
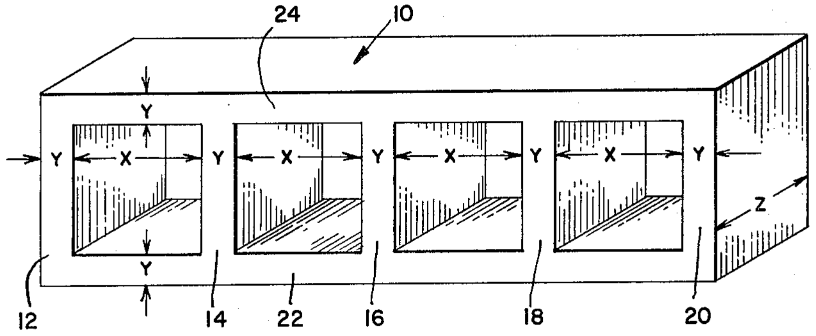
FIG. 1 is a perspective view of one multipath magnetic core showing the geometric configuration thereof.

Referring now to the drawings, there is shown in FIG. 1 a rectangular ferrite magnetic core 10. The magnetic material forming the magnetic core preferably has a substantially square or rectangular hysteresis characteristic. The core 10 has a geometric configuration which is symmetrical. The core includes a plurality of leg portions 12, 14, 16, 18, and 20 integrally interconnected with side portions 22 and 24. The core has a uniform thickness Z. The width Y of the respective leg portions is equal and equals the width of the side portions. The distance X between the respective leg portions is substantially equal. This type of multi-aperture ferrite device is known as a "Laddic."

Figure 2:
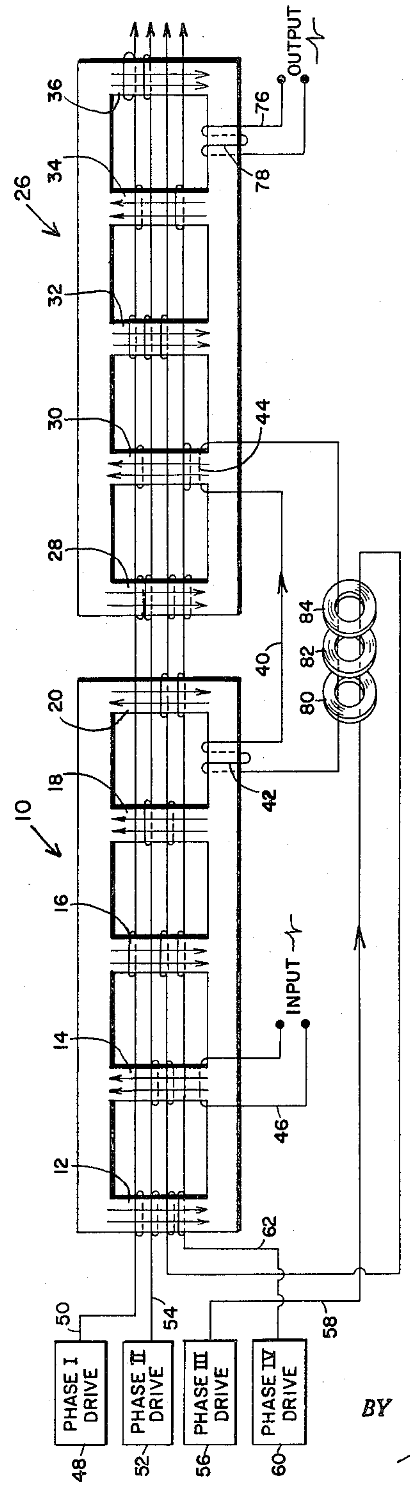
FIG. 2 is a diagrammatic showing of the magnetic shift register circuit having two identical multi-aperture magnetic cores and the windings necessary to shift and store bits of information.

Referring to FIG. 2, the magnetic shift register circuit includes a first multi-aperture magnetic core 10, and a second multi-aperture core 26. The geometric configuration of the core 26 is substantially identical to the core 10. The core 26 has separate leg portions 28, 30, 32, 34, and 36. The separate leg portions define paths for the magnetic flux set into the core.

A coupling wire loop 40 links the first core 10 with the second core 26. The wire loop includes a winding 42 that surrounds a portion of the core 10 adjacent the leg portion 20. A second winding 44 of the wire loop 40 surrounds the leg portion 30 of the second core 26. For purposes of gain the winding 42 has two turns while the winding 44 has one turn.

An input winding 46 surrounds the leg 14 of the first core 10. A current in the input winding will switch the flux pattern of leg portion 14. This flux represents information stored in the core.

This information is shifted within the first core 10 and transferred to the second core 26 and is shifted within the second core 26 by a four-phase drive. As shown in FIG. 2, a phase I drive 48 is coupled to the cores by phase I drive line 50. The drive line 50 surrounds leg 12 and leg 16 of the first core 10 and each of the leg portions of the second core 26. A phase II drive 52 is connected to the cores by the drive line 54. The drive line 54 surrounds leg portions 12, 14 and 18 of the first core 10 and leg portions 28, 32 and 36 of the second core 26. A phase III drive 56 is connected to the cores by a phase III drive line 58. The drive line 58 surrounds each leg portion of the first core 10 and leg portion 28 and 32 of the second core 26. A phase IV drive 60 is connected to the cores with a phase IV drive line 62. The line 62 surrounds leg portions 12, 16 and 20 of the first core 10 and leg portion 28, 30 and 34 of the second core 26. The information established in the first core 10 by a current in the input winding 46 is shifted in the circuit in the form of magnetic flux by the sequential operation of the phase drives 48, 52, 56, and 60.

The direction of the information flow in the circuit is controlled by selectively biasing the leg portions of the cores so that the flux pattern therein will not switch. A current pulse in the respective drive lines biases selected leg portions of the cores. Bias windings of the drive lines on the leg portions determine which leg portions are biased during each of the phase drives.

An output winding 76 having a plurality of turns 78 surrounds a portion of the second core 26 which is adjacent the leg portion 36. A change in the flux pattern of the leg portion 36 will induce an output signal in the winding 76. A continuous end around operation can be accomplished by connecting the output winding 76 with the input winding 46. The circuit when connected end around remains substantially stable.

A plurality of separate magnetic cores 80, 82, and 84 are placed in the coupling loop 40 to function as noise cancellers. The drive line 58 passes through each of the cores in series with the first core 10 and second core 26. The cores 80, 82, and 84 are driven by the phase III drive to produce a small elastic voltage in opposition to the output pulse induced in the coupling loop 40 by the flux change in the leg portion 20 of the first core 10.

For purposes of explanation to show the direction of the flux pattern in a particular leg or the remanent state of the particular leg, two arrows are used. If a particular leg is half saturated or set the legs' respective arrows are shown pointing in opposite directions.

Figure 3:
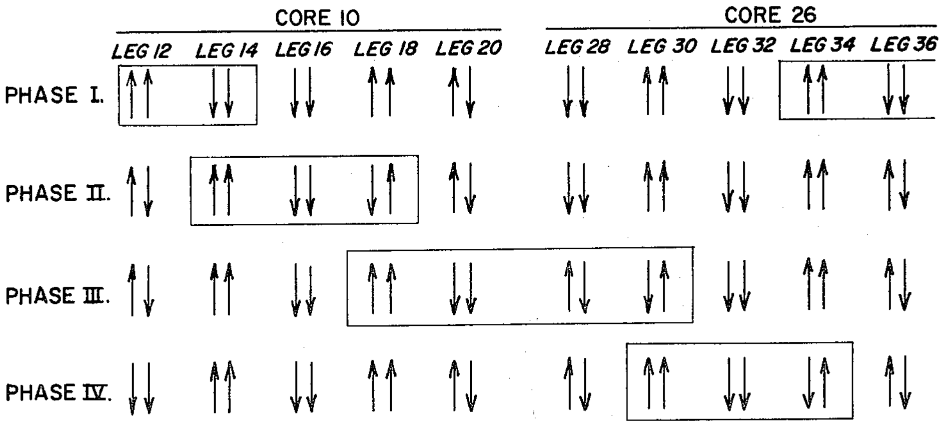
FIG. 3 is a diagram of the magnetic flux patterns in the particular leg portions of the cores of FIG. 2.

The diagram of FIG. 3 illustrates the flux pattern in the respective leg portions of the first core 10 and second core 26. The operation of the magnetic shift register circuit will be described in conjunction with this diagram.

Phase I: An input signal applied to the leg portion 14 of the first core changes the flux pattern in said leg portion and in leg portion 12. The flux pattern in leg portion 16 will not be affected because it is held downward by a biasing M.M.F. produced by a current in drive line 50 which surrounds leg 16. The flux in the leg portions 12 and 14 represent a bit of information.

Phase II: The phase II drive changes the flux pattern in the leg portions 14 and 18. The leg portion 12 is biased by an M.M.F., produced by a current in drive line 54 which surrounds leg 12, which bias does not exceed the threshold of leg portion 12. Since the flux pattern in leg 16 is saturated in a downward direction, no switching thereof will take place. The bit of information is now represented by the flux in leg portions 14 and 18.

Phase III: The phase III drive 56 saturates the leg portion 18 in an upward direction and the leg portion 20 in a downward direction. This flux change induces a voltage in the coupling wire loop 40. The signal in the loop 40 alters the flux pattern in the leg portion 30 and 28. The flux pattern of the leg portion 32 does not change because it is biased downward by an M.M.F. produced by a current in drive line 58 which surrounds leg portion 32. Leg portions 12 and 14 are biased, by an M.M.F. produced by a current in drive line 58 which surrounds leg portions 12 and 14, to prevent them from switching. The flux pattern in the leg portion 20 will switch as long as the M.M.F. needed to switch from leg portion 18 around leg portion 20 and its load is less than the M.M.F. needed to overcome the threshold of the path around leg portion 18 to leg portion 12.

Phase IV: The phase IV drive changes the flux pattern in leg portion 12 downward and changes a portion of the flux in leg portion 20 upward. In the second core 26 the flux pattern in the leg portion 34 is directed downwardly by the phase IV drive. Leg portion 28 is biased, by an M.M.F. induced because drive line 62 surrounds leg portion 28 to prevent it from switching. The bit of information is now represented by the flux pattern in leg portions 30 and 34.

The operation of the phase I drive will alter the flux pattern around leg portions 34 and 36. This flux change will induce a voltage in the output winding 76 at the same time an input signal can be supplied to the input winding 46.

It should be recognized with respect to FIGURE 3 that the flux pattern switches in all phases of the shift register are made against opposed flux patterns which creates a load to reduce counter current thereby resulting in minimum switching time and minimum power requirements. Thus, in phase II, when leg 14 switches, it causes a partial switch to opposing leg 18. Likewise, in phase III, when leg 18 partially switches it causes a partial switch to opposing leg 20 which induces the current to partially switch leg 28 to cause partial switching to opposing leg 30. And lastly, in phase IV, when leg 30 partially switches it causes a partial switch to opposed leg 34.

While there have been shown and described and pointed out the fundamental novel features of the invention as applied to a preferred embodiment, it will be understood that various omissions, substitutions, changes in the form, and details of the circuit illustrated and its operation may be made by those skilled in the art, without departing from the spirit of the invention. It is the intention, therefore, to be limited only as indicated by the scope of the following claims.

What is claimed is:

1. A binary storage and shifting device comprising a plurality of separate magnetic cores, each core having a plurality of equally spaced leg portions, means coupling the separate cores to each other for transferring an output pulse from one core to another core, without independent means therebetween, an input means coupled to one core to provide the device with information by switching the flux pattern of a portion of said one core, drive means selectively linked with the leg portions of the cores to switch the flux patterns therein selectively always against opposed flux patterns in adjacent leg portions, to shift the information in the device, bias means linked to the leg portions to selectively prevent switching of the flux patterns therein thereby preventing reverse flow of the information, and output means coupled to another core to sense the switching of the flux pattern of said another core.

2. A binary storage and shifting device comprising a plurality of magnetic cores, each core having a plurality of equally spaced leg portions, conductor means coupling the separate cores to each other for transferring an output pulse from one core to another core without independent means therebetween, input means coupled to one core to switch the flux pattern of a portion of said core, four separate drive means selectively linked with the leg portions of the cores to selectively switch the flux pattern therein against opposed flux patterns in four phases, bias means linked to the leg portions to selectively prevent switching of the flux patterns therein, and output means coupled to another core to sense the switching of the flux pattern of said another core.

3. A binary storage and shifting device comprising a plurality of magnetic cores, each core having a plurality of equally spaced leg portions, conductor means coupling the separate cores to each other for transferring an output pulse from one core to another core without independent means therebetween, input means coupled to one core to switch the flux pattern of a portion of said core, four separate drive means selectively linked with the leg portions of the cores to selectively switch the flux pattern therein against opposed flux patterns in four phases, separate magnetic cores in the coupling conductor means for reducing the noise of the device, said cores being driven by the third drive means to produce a small elastic voltage in opposition to the output pulse of the one core, bias means linked to the leg portions to selectively prevent switching of the flux patterns therein, and output means coupled to another core to sense the switching of the flux pattern of said another core.

4. A binary storage and shifting device comprising a first and second magnetic core, each core having a plurality of equally spaced leg portions, conductor means coupling one of the legs of the first core with one of the legs of the second core for transferring an output pulse from the first core to the second core without independent means therebetween, input means coupled to a leg of the first core to provide the device with information by switching the flux pattern therein, four separate drive means linked with the leg portions to selectively switch the flux pattern therein selectively against opposed flux patterns in the leg portions in four phases, bias means linked to the leg portions to selectively prevent switching of the flux patterns therein thereby preventing reverse flow of the information, and output means coupled to a leg of the second core for sensing a flux change therein.

5. A binary storage and shifting device as defined in claim 4 including separate magnetic cores in the coupling conductor means for reducing the noise of the device, said cores being driven by the third drive means to produce a small elastic voltage in opposition to the output pulse of the first core.

6. A binary storage and shifting device comprising a first and second magnetic core, each core having a plurality of equally spaced leg portions, conductor means coupling one of the legs of the first core with one of the legs of the second core for transferring an output pulse from the first core to the second core, input means coupled to a leg of the first core to provide the device with information by switching the flux pattern therein, drive means linked with the leg portions to switch the flux pattern therein selectively and always against an opposed flux pattern, bias means linked to the leg portions to selectively prevent switching of the flux patterns therein thereby preventing reverse flow of the information, and output means coupled to a leg of the second core for sensing a flux change therein.

7. A magnetic shift register circuit comprising a first and second magnetic core, each core having five equally spaced leg portions defining separate flux paths, conductor means coupling the fifth leg portion of the first core with the second leg portion of the second core, input means linked to the second leg portion of the first core to provide the circuit with information by switching the flux pattern therein, a first, second, third and fourth drive means each linked in series with the leg portions of the first and second cores to selectively switch the flux patterns therein selectively always against opposed flux patterns in adjacent leg portions in four phases, means biasing the first three legs of the first and second cores to selectively prevent switching of the flux patterns therein thereby preventing reverse flow of information, and output means linked to the fifth leg portion of the second core for sensing a flux change therein, wherein at phase I, an input current applied to the second leg portion of the first core switches the flux pattern in the first and second leg portions and a bias applied to the third leg portion of the first core prevents switching of its flux pattern, at phase II, a current applied to the second drive means switches the flux pattern in the second and fourth leg portions of the first core and a bias applied to said first leg portion below its threshold prevents switching thereof, at phase III, a current applied to the third drive means switches the flux pattern in the fourth and fifth leg portions of the first core thereby inducing a voltage in the coupling conductor means which switches the flux pattern in the first and second leg portions of the second core and a bias applied to said first and second leg portions of the first core prevents switching thereof, and at phase IV, a current applied to the fourth drive means switches the flux patterns in the first and fifth leg portions of the first core and in the second and fourth leg portions of the second core and a bias applied to the third leg portion of the second core prevents switching thereof.

8. A magnetic shift register circuit as defined in claim 7 including separate magnetic cores in the coupling conductor means for reducing the noise of the circuit, said cores being driven by the third drive means to produce a small elastic voltage in opposition to the output pulse of the fifth leg portion of the first core.

9. In a binary storage and shift register circuit the combination of

- a first and a second magnetic core each having a plurality of leg portions defining separate flux paths,
- an input means coupled to one of the leg portions of the first core to provide the circuit with a bit of information by setting a flux pattern in said one leg portion,
- conductor coupling means coupling another leg portion of the first core with one of the leg portions of the second core for transferring an output pulse from the first core to the second core,
- drive means linked with the leg portions of both cores to sequentially shift said flux patterns to adjacent leg portions in said first core and thence to leg portions in said second core with said shifting always being against an opposed flux pattern in the adjacent leg portions,
- bias means linked to the leg portions to selectively prevent switching of the flux patterns therein to thereby prevent reverse flow of information, and
- output means coupled to a leg of the second core for sensing a flux change therein when said flux pattern is shifted thereto.

References Cited by the Examiner

UNITED STATES PATENTS

| | | | |
|---|---|---|---|
| 3,040,302 | 6/62 | Dumaire | 340—174 |
| 3,045,215 | 7/62 | Gianola | 340—174 |
| 3,059,224 | 10/62 | Post | 340—174 |
| 3,086,124 | 4/63 | Schulte | 340—174 |
| 3,086,198 | 4/63 | Tate | 340—174 |
| 3,106,702 | 10/63 | Haynes et al. | 340—174 |

IRVING L. SRAGOW, *Primary Examiner.*

BERNARD KONICK, *Examiner.*